Figure 1:
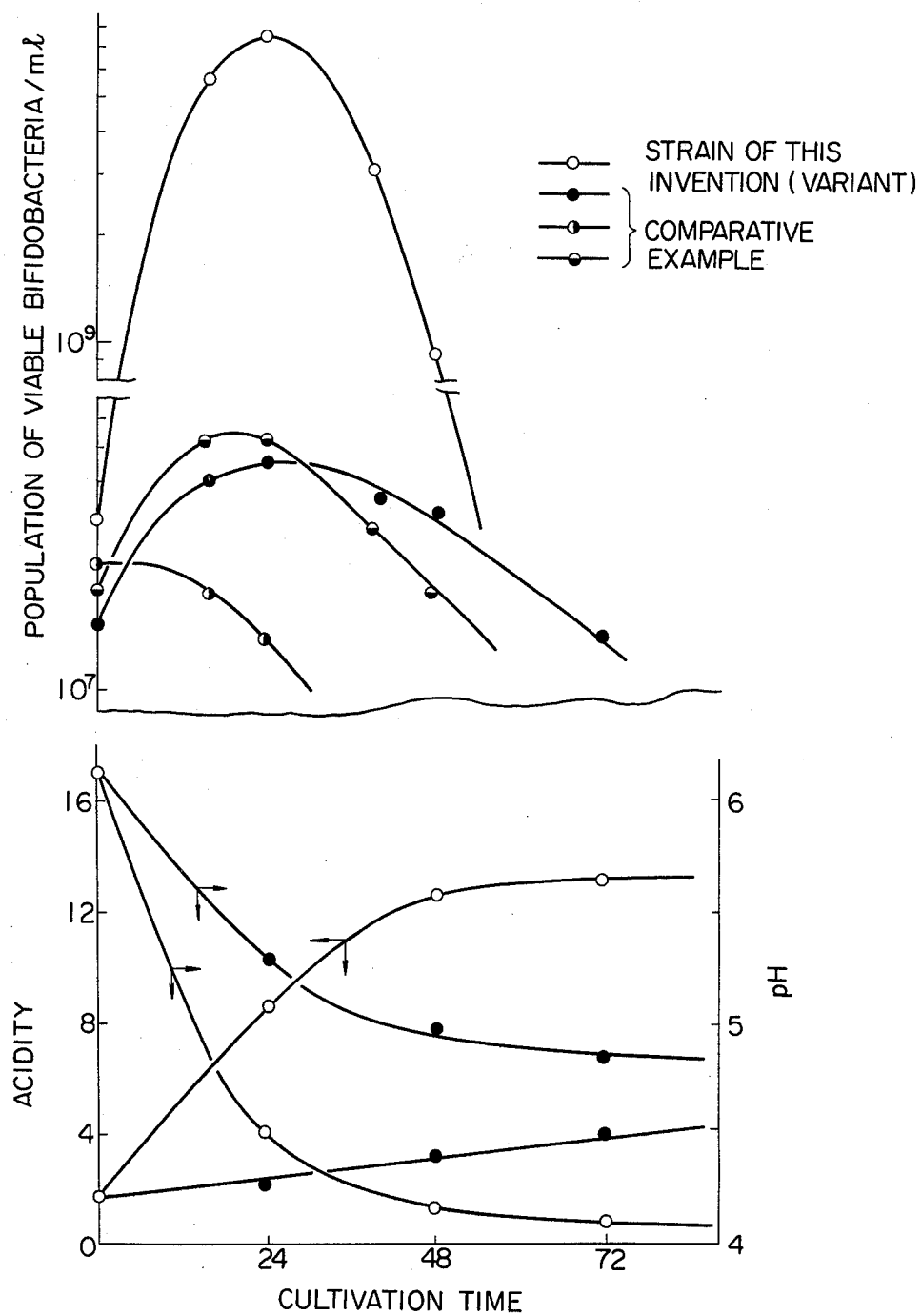

United States Patent [19]

Mutai et al.

[11] 4,087,559

[45] May 2, 1978

[54] FERMENTED MILK CONTAINING VIABLE BIFIDOBACTERIA

[75] Inventors: Masahiko Mutai, Higashi Yamato; Mitsuo Mada, Kodaira; Kei Nakajima, Fuchu; Kiyohiro Shimada; Takashi Iijima, both of Kunitachi, all of Japan

[73] Assignee: Kabushiki Kaisha Yakult Honsha, Tokyo, Japan

[21] Appl. No.: 735,412

[22] Filed: Oct. 26, 1976

[30] Foreign Application Priority Data

Jan. 1, 1976   Japan ..................................... 51-295

[51] Int. Cl.$^2$ .............................................. A23C 9/12
[52] U.S. Cl. ........................................ 426/43; 426/61
[58] Field of Search ....................... 426/34, 42, 43, 61, 426/71

[56] References Cited

U.S. PATENT DOCUMENTS 3,480,443   11/1969   Schuler .............................. 426/61 X

FOREIGN PATENT DOCUMENTS 1,952,361   4/1971   Germany ............................... 426/43
2,421,084   11/1975   Germany ............................... 426/34
1,202,539   8/1970   United Kingdom ................... 426/43

Primary Examiner—David M. Naff
Attorney, Agent, or Firm—Wenderoth, Lind & Ponack

[57] ABSTRACT

This invention relates to a method for producing fermented milk containing viable bifidobacteria by cultivating a variant of bifidobacteria in a milk medium, characterized in that the variant of bifidobacteria can be propagated under aerobic condition in a pure milk medium which does not contain any growth-promoting substance.

1 Claim, 2 Drawing Figures

FERMENTED MILK CONTAINING VIABLE BIFIDOBACTERIA

This invention relates to a fermented milk product containing viable bifidobacteria and a process for producing the same.

Bifidobacteria are well known as dominant bacteria found in the intestinal flora of a breast-fed infant. Bifidobacteria have been known to provide various physiological properties as follows:

(a) suppression of putrefactive bacteria;
(b) inhibition of production of toxic amines;
(c) promotion of digestion of human milk casein by the action of phosphoprotein phosphatase; and
(d) inhibition of growth of pathogenic bacteria in conjunction with lowering the pH in the intestines by generation of lactic acid, acetic acid, formic acid and the like.

However, an infant who is bottle-fed has very few intestinal bifidobacteria which, as mentioned above, have various effects in keeping the intestines healthy. This is considered to be the reason why a bottle-fed infant is more susceptible to diseases of the intestines in comparison with a breast-fed infant. Therefore, for the purpose of converting the intestinal flora of a bottle-fed infant to those similar to that of a breast-fed infant, modified powdered milk for infants containing bifidobacteria has tentatively been prepared as a substitute for human milk.

However, according to the conventional process, cultivating bifidobacteria in a medium such as milk and the like has involved the following difficulties, and therefore has not been practically carried out on a commercial scale. The difficulties are (in comparison with lactic acid bacteria which are widely used in processing milk):

(a) The conditions of cultivation must be strictly anaerobic;
(b) The nutrition conditions required in the cultivation are complicated and strict, and therefore the bacteria does not propagate in a pure milk medium which does not contain a growth-promoting substance such as yeast extract and the like; and
(c) It is difficult to maintain the bacteria in a viable state for a long time at low pH like in a conventional fermented milk since the acid-resistance of the bifidobacteria is low.

If a growth-promoting substance for bifidobacteria is added to a milk medium, the bifidobacteria can be cultivated even in an aerobic condition. However, the product from this culture often impairs the taste and flavor of the milk product. In addition to this disadvantage, the growth-promoting substance is generally expensive, and therefore it is not practical to use.

As a study of culture using bifidobacteria, we have discovered a new strain of bifidobacteria having unique properties, which can be actively propagated under aerobic conditions in a pure milk medium which does not contain any growth-promoting substances or reducing agents. The present invention is based on this new strain of bifidobacteria, and relates to a method for producing a fermented milk product, characterized by cultivating this new strain of bifidobacteria in a milk medium such as whole milk, skim milk or reconstituted milk.

Advantages of the use of the new strain of bifidobacteria in this invention are as follows:

(a) It is easily cultivated without using any special conditions of cultivation. That is, it is easily propagated under aerobic condition without adding a growth-promoting substance.
(b) It is possible to prevent unfavorable affection effects on the taste of the cultivated product, and the seasoning of the cultivated product is easy.
(c) Since the cultivated product of this invention does not contain any additives such as growth-promoting substances, it is desirable as infant food or as an additive to infant food.
(d) The new strain is essentially oxygen-resistant and the nutrition conditions required in the cultivation are simple.

Consequently, the cultivated product (or processed cultivated product) maintains the high viability of the bacteria during preservation, and is relatively easily processed into food and drink containing viable bacteria without substantially decreasing the viability of the bacteria.

The new strain of bifidobacteria used in this invention which provides the above mentioned advantages is "*Bifidobacterium bifidum* YIT-4002." This new strain was discovered in the successive transfer culture of bifidobacteria taken from the feces of a healthy breast-fed infant, and has the following characteristics.

(1) Main bacteriological properties

This strain is Gram-positive non-spore forming bacillus (0.5 × 2 - 3 μ), and has granules having an affinity with methylene blue in the inside of the cell. According to the observation by a microscope, this bacteria has branched edges having polymorphous shapes such as Y shape, V shape or bend. A colony formed by double-layer plate method is cylindric, convex or lens-shaped and a colony formed at the bottom of the plate is variable in shape. When cultivated in anaerobic VL-G liquid medium for 72 hours, mole ratio of acetic acid and lactic acid formed was 1.6 ± 0.5 (acetic acid/lactic acid). The lactic acid thus formed in the above liquid medium was checked with regard to optical rotation, and the results were as follows:

Specific rotatory activity: −0.038
Optical activity: L (+) 76% + DL 24%

The results of the following tests were as follows: Catalase activity (−), Carbon dioxide gas production (−), Milk coagulating activity (+), Gelatine hydrolysis (−), Nitrate reducing activity (−), Inodole production (−), and Hydrogen sulfide generation (−).

The above results satisfy the definition of genus Bifidobacterium.

(2) Optimum propagation temperature and pH

Optimum propagation temperature: 36° - 38° C

The bacteria does not propagate at a temperature of lower than 25° C or higher than 45° C.

Optimum propagation pH: 6 - 7

The bacteria does not propagate at a pH of lower than 5.0

(3) Sugar fermentation

The bacteria of this invention has positive fermentation reaction with regard to the following sugars: glucose, fructose, lactose and galactose.

The bacteria has negative fermentation reaction with regard to the following sugars: arabinose, xylose, salicin, mannose, mannitol, melezitose, cellobiose, sorbitol, inulin, trehalose, rhamnose, maltose, ribose and sorbose.

This fermentation pattern completely corresponds to that of a standard strain of bifidobacteria (*Bifidobacterium bifidum* E 319).

(4) Oxygen-susceptibility and nutrition requirements

The bacteria of this invention was incubated in numbers of $10^7 - 10^8$/ml and aerobically cultivated at 37° C in a reduced skimmed milk medium (solid-milk-content = 12%, containing no growth-promoting substance) saturated with oxygen (about 6.5 ppm). The population reached more than $10^9$/ml in 24 hour-incubation.

Ordinary bifidus bacteria hardly propagated under the same condition as above. The population remained the same or was less (see the following Example 2).

As described above, taxologically the bacteria of this invention completely corresponds to *Bifidobacterium bifidum*, except that the bacteria of this invention propagate well in a pure milk medium under aerobic condition wherein ordinary bifidobacteria can not propagate. In view of these properties, the bacterial strain of this invention was identified as a variant of *Bifidobacterium bifidum* and was named as "*Bifidobacterium bifidum* YIT-4002" (This identification was made in accordance with Bergey's Manual of 1974). This new strain was deposited at FERMENTATION RESEARCH INSTITUTE, Agency of Industrial Science & Technology of No. 8 - 1, Inage Higashi-5-chome, Chiba-shi, Chiba-ken, Japan. The deposit number is FERM-P No. 3371.

As described above, the new strain of bifidobacteria of this invention has desirable properties, and therefore it is easily cultivated without employing any special conditions for cultivation in the same manner as ordinary lactic acid bacteria culture requires. Accordingly, it is possible to carry out a mixed cultivation of the strain of bifidobacteria with lactic acid bacteria. In the cultivation of the conventional bifidobacteria, the presence of a reducing agent and growth-promoting agent is absolutely necessary, but in the cultivation of the new strain of bifidobacteria of this invention, their presence is not necessary. However, a growth-promoting agent may be present in the process of this invention in order to fully promote the propagation so long as it does not hinder the use of the cultured product.

Under ordinary conditions, the population of viable bifidobacteria reaches a maximum in 18 - 24 hour-incubation, but as the cultivation proceeds, acid is generated and consequently the pH decreases. If cultivation is continued further, the population begins to decrease but the generation of acid still continues for a while and thereafter the generated acid becomes saturated. Accordingly, cultivation is stopped at a suitable stage depending on the use of the cultured product.

The cultured product can be used as it is as a food and drink containing viable bifidobacteria, or it may optionally be mixed with sweetening materials, fruit juice, water or other milk products. Or the cultured product may be used after being freeze-dried or spray-dried into a powdery product.

The present invention is further illustrated by the following Examples, in which the number of live bacteria were measured in accordance with one dimensional diffusion method using a modified culture medium of Rogosa, and the "acidity" shows an amount in milliliters of 0.1 N sodium hydroxide required to neutralize 5 ml of culture solution. "Variant" refers to the new strain, i.e. "*Bifidobacterium bifidum* YIT-4002 (FERM-P No. 3371)" of this invention.

EXAMPLE 1

The "Variant" of this invention and three kinds of standard strains of typical bifidus bacteria (comparative examples) were anaerobically cultivated.

Seed culture was prepared by cultivating the desired bacteria in modified medium of Rogosa (1 ml of pyruvic acid and 0.2 g of reduced glutathione per 1 liter of liquid medium free from agar were added to the medium) and suspending the cultured bacteria collected and washed under sterile condition in a buffer solution of 1/100 M phosphate (pH 6.8) to provide a suspension (OD 660 m$\mu$ = 1.5).

The medium used for main propagation was reduced non-fat milk (solid milk content = 12%). The medium was sterilized and placed in an anaerobic jar, the atmosphere of which was replaced by a mixture of 95% of nitrogen gas and 5% of carbon dioxide gas to effect the anaerobic state. The amount of dissolved oxygen in the medium was 0.1 ppm at the beginning of cultivation.

The accompanying FIG. 1 shows the relationship between the culture time and the variations of population of viable bifidobacterium, acidity and pH. In the case of the Variant, the population of viable bifidobacterium reached $6.5 \times 10^9$/ml in 24 hour-incubation, and with an increase in population of viable bifidobacteria, a considerable amount of acid is generated, thus lowering the pH of the medium. On the other hand, in the case of comparative standard strains, only a small extent of propagation could be recognized, and it was proved that the comparative standard strains are not substantially propagated in a pure non-fat milk medium even under anaerobic condition.

EXAMPLE 2

Aerobic cultivation was carried out using the same seed culture and medium as used in Example 1. After sterilizing the medium, oxygen gas was passed through the medium to saturate the medium saturated with oxygen (amount of dissolved oxygen = 6.5 ppm).

Figure 2:
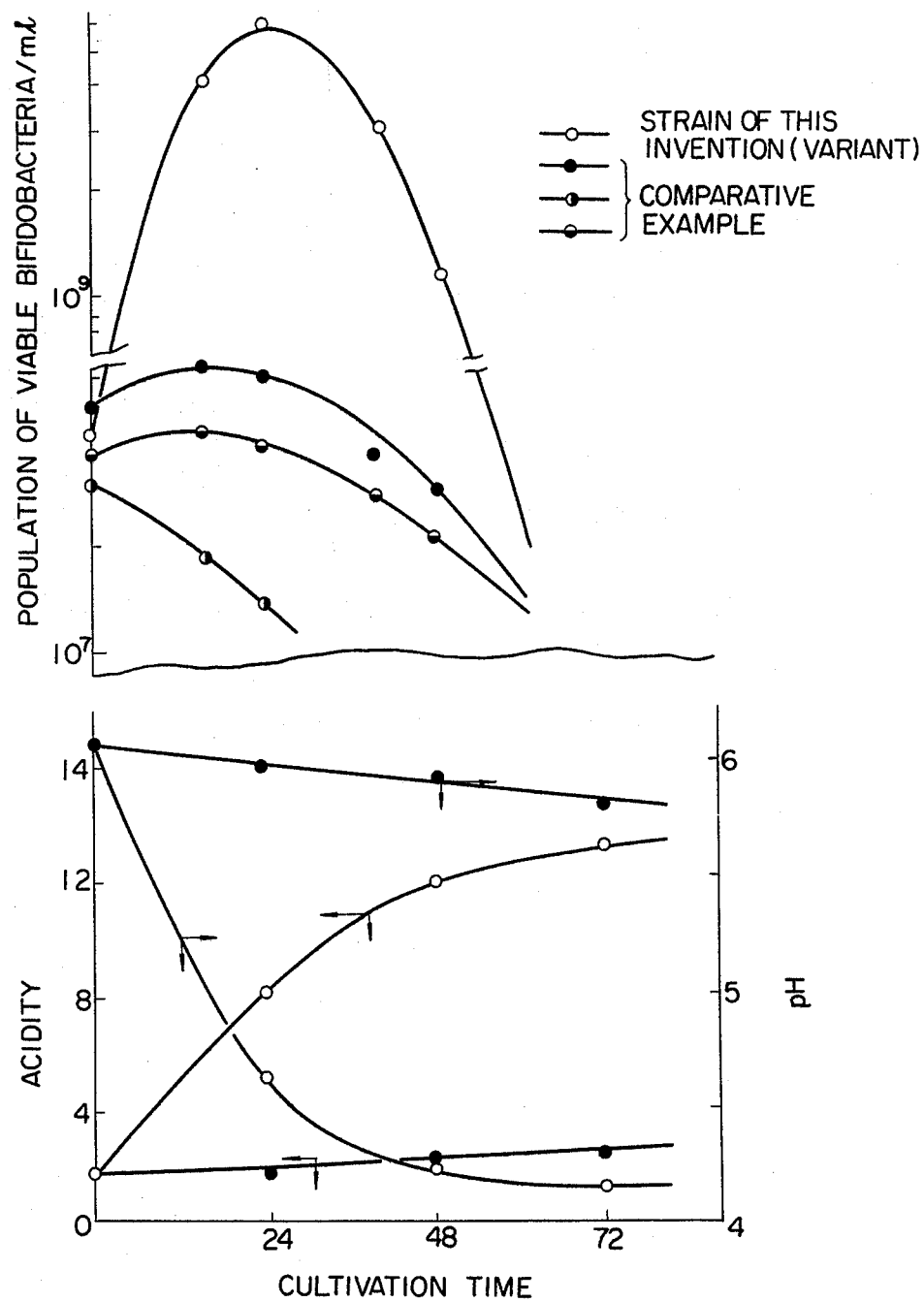

The results of cultivation are shown in FIG. 2. The Variant of this invention propagates in the same manner as anaerobic cultivation mentioned above, and the population of viable bifidobacteria reached $5.0 \times 10^9$/ml after a lapse of 24 hours from inoculation. On the other hand, in the case of comparative standard strains, substantial propagation was not recognized, and in some cases the population of viable bifidobacteria even decreased immediately after inoculation.

EXAMPLE 3

In this Example, various conditions for cultivating the Variant of this invention for the preparation of fermented milk were studied.

(i) Relation between the Amount of Starter and Propagation

Starter was prepared by cultivating in reduced non-fat milk medium (solid milk content = 8%) for 20 hours, and was preserved at a low temperature for three days. The starter thus prepared was added to reduced non-fat milk in various amounts ranging from 1 to 10%, and was aerobically cultivated. When the starter was added in an amount of up to 3%, the amount of acid generation increased in proportion to the increase of the amount of the starter added. However, even when the starter was added in an amount of more than 3%, the amount of acid generation was substantially the same. According to a pilot test with regard to the amount of the starter added, it was proved that 1 to 2% of the starter is sufficient. According to the conventional reports, the starter has been generally used in an amount of 5 to 10%. In order to prepare such a large amount of starter, a starter for preparing the "starter" is necessary.

(ii) Relation between the Temperature and Propagation of the Culture

Reduced non-fat milk (solid milk content = 16%) was prepared and the medium was then sterilized. The sterilized medium was then cooled to 37° C while passing sterilized air therethrough. 2.0% of the above prepared starter was inoculated into the medium and was cultured respectively at 30°, 34°, 37°, 40° and 43° C. Propagation in the culture at 37° C was best and those in the culture at 34° and 40° C were good, but propagations in the culture at 30° and 43° C were considerably restricted.

(iii) Relation between Maintenance of Population of Viable Bifidobacteria and pH The Variant of this invention was inoculated into respective non-fat milk mediums (solid milk content = 12%), and was cultured until the pH of each medium reached 5.0, 4.6, 4.3 and 4.1 respectively. The four mediums were rapidly cooled to 5° C and were preserved to determine variations of population of viable bifidobacteria in accordance with a lapse of time. The results are shown in the following Table 1 (These numerical values are population of viable bifidobacteria per 1 ml of culture medium).

Table 1

| pH | Acidity | number of Days Preserved | | | | |
|---|---|---|---|---|---|---|
| | | 0 | 3 | 5 | 7 | 10 |
| 5.0 | 9.0 | $4.4 \times 10^9$ | $3.2 \times 10^9$ | $9.6 \times 10^8$ | $4.2 \times 10^8$ | $6.8 \times 10^7$ |
| 4.6 | 9.8 | $5.4 \times 10^9$ | $7.2 \times 10^8$ | $2.3 \times 10^8$ | $8.0 \times 10^7$ | $1.2 \times 10^7$ |
| 4.3 | 11.5 | $3.0 \times 10^9$ | $1.7 \times 10^7$ | $5.7 \times 10^5$ | $2.6 \times 10^3$ | $1.5 \times 10^1$ |
| 4.1 | 13.4 | $6.0 \times 10^8$ | $8.5 \times 10^5$ | $4.7 \times 10^3$ | $<10^1$ | $<10^1$ |

The decrease in population of viable bifidobacteria in accordance with the preservation time varies depending on the pH of the medium. In the case of the medium having a pH of 4.3 or less, population of viable bifidobacteria rapidly decreases as time passes, while in the case of the medium having a pH of 4.6 or more, population of viable bifidobacteria is not so rapidly decreased. The above test was described with regard to reduced non-fat milk, but the same results as above were obtained with regard to whole milk, non-fat milk and mixed milk thereof.

EXAMPLE 4

Preparation of Fermented Milk (1) 160 g of non-fat powdered milk was dissolved in water to prepare 1 liter of solution, and the solution was sterilized by heating at 100° C for 30 minutes. After cooling the sterilized solution, 2% of Variant starter (previously cultivated under pure condition) was added to the solution and was cultivated at 37° C for 16 hours. 525 ml of the cultivated solution was mixed with 475 ml of syrup containing 35 g of sugar and 35 g of sorbitol. Spice was then added to the mixture and the mixture was homogenized to produce a fermented milk product. The product thus obtained had an acidity of 3.5 and a pH of 4.7, and population of viable bifidobacteria was $2.9 \times 10^9$/ml.

(2) Non-fat powdered milk was added to whole milk to prepare a mixture having a solid non-fat milk content of 16%, and the mixture was sterilized by heating. 5% of *Lactobacillus acidophilus* starter and 1% of Variant starter were added to the mixture, and were cultivated at 37° C for 20 hours. 525 ml of the cultivated solution was mixed with 472 ml of syrup containing 20 g of glucose and 35 g of fructose. After adding spice to the mixture, the mixture was homogenized to produce a fermented milk product. The product thus obtained had an acidity of 3.3 and a pH of 4.8. Population of viable bifidobacteria of the Variant was $1.9 \times 10^9$/ml and that of acidophilus-bacteria was $5.0 \times 10^8$/ml.

(3) 100 g of non-fat powdered milk and 60 g of whole powdered milk were dissolved in water to prepare 1 liter of solution. After sterilizing the solution, 3% of the Variant starter was added to the solution, and was cultured at 37° C for 12 hours. 525 ml of the cultivated solution was mixed with syrup containing 100 g of fruit juice (tangerine and apple), 40 g of sugar and 35 g of sorbitol. Spice was then added to the mixture and the mixture was homogenized to produce a fermented milk product. The product thus obtained had an acidity of 4.0 and a pH of 4.6, and population of viable bifidobacteria was $1.5 \times 10^9$/ml.

What is claimed is:

1. A method for producing fermented milk containing viable bifidobacteria, which comprises cultivating *Bifidobacterium bifidum* YIT-4002 in a medium consisting of whole milk, skim milk or reconstituted milk.

* * * * *